July 28, 1936.  F. ROSENGARTH  2,048,817

MANUFACTURE OF HEAT INSULATING TUBES

Filed April 27, 1933

Inventor:
Friedrich Rosengarth
per
Dorsey & Cole
Attorney.

Patented July 28, 1936

2,048,817

UNITED STATES PATENT OFFICE 2,048,817

MANUFACTURE OF HEAT INSULATING TUBES

Friedrich Rosengarth, Cologne-on-the-Rhine, Germany, assignor to Naamlooze Vennootschap Maatschappij tot Beheer en Exploitatie van Octrooien, The Hague, Netherlands Application April 27, 1933, Serial No. 668,249
In Germany May 17, 1932

7 Claims. (Cl. 154—27)

This invention relates to the manufacture of heat insulating tubes from glass silk and the like fibrous material, more particularly designed to be used as non-conducting coverings for pipes and other elements.

The invention has for one of its objects to provide a process of manufacturing tubes of the kind stated, which consists in supplying the fibrous material in the form of threads, ropes, strips or the like to a rotating mandrel, winding it thereon to form a cylindrical body, imparting a forward movement to the body in axial direction while keeping the mandrel rotating and feeding to its outer surface a covering strip which is carried along by the cylindrical body and caused to wind helically around the same forming an envelope, so that enveloped insulating tubes of any desired length will be produced. The covering strip may consist of paper, jute, asbestos or the like or of sheet metal, wire fabric and similar material. According to the nature of the material used for the covering strips, these are united by the application of glue or by welding or soldering.

Another object of the invention is to provide a simple and efficient device for practising the process, this device essentially comprising a rotating mandrel and a moulding cylinder concentrically surrounding the mandrel, this cylinder having internal screw threads and a longitudinal slot through which to introduce the covering strip between the inner surface of the moulding cylinder and the outer surface of the fibre body. The fibres wound on the mandrel are preferably pushed into the moulding cylinder by means of a filling member or stopper adapted to be reciprocated on the mandrel. The mandrel is provided with projections which cause the fibre body to take part in the rotating movement of the mandrel.

An embodiment of a device according to the invention is illustrated, by way of example, in the accompanying drawing in which.

Figure 1:
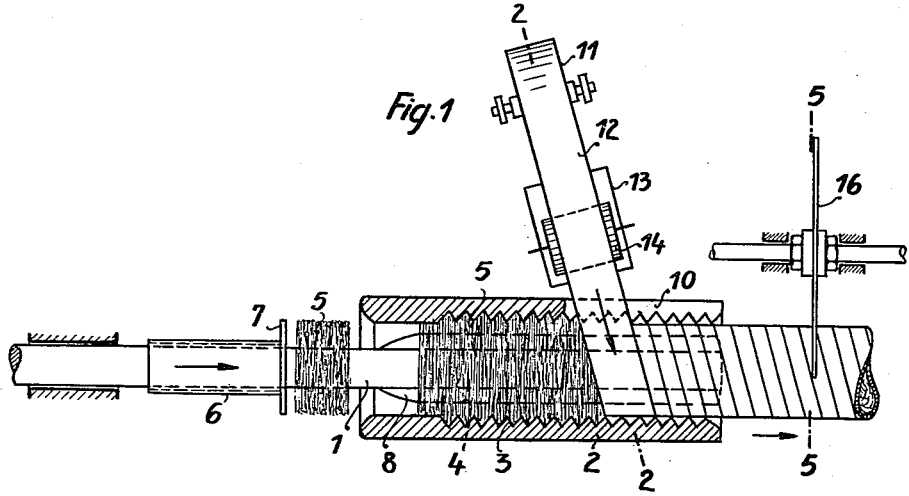
Fig. 1 is a plan view of the device, partly in section.
Figure 3A:
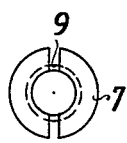
Fig. 3a is an end view thereof.
Figure 3:
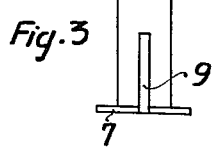
Fig. 3 is a plan view of the filling or stopping member.
Figure 4:
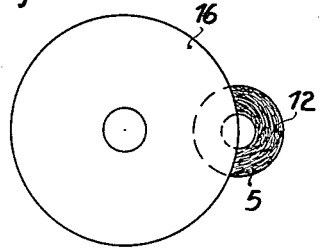
Fig. 4 is a section on the line 4—4 of Fig. 1.
Figure 2:
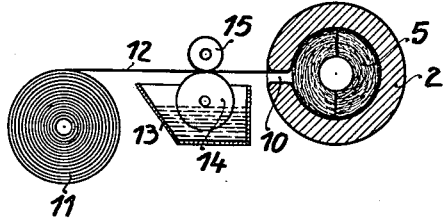
Fig. 2 is a section on the line 2—2 of Fig. 1.

Referring to the drawing in detail, I designates a continuously or intermittently driven rotating mandrel which extends axially into a moulding cylinder 2 having internal threads 3. The portion of the mandrel lying in the cylinder has longitudinally extended ribs 4 which carry along with them the fibrous material 5 pushed into the cylinder 2. The mandrel carries a filling member or stopper consisting of a sleeve 6 with a flange 7 which has tongue and groove connection with the mandrel so that it will rotate with the mandrel but can be shifted to and fro longitudinally of the same. The carrier ribs 4 form blades 8 at their forward ends and the stopper 6, 7 has slots 9 which pass over the blades 8 when a charge of fibres is pushed into the cylinder 2, so that corresponding incisions are produced in the fibre charge.

The cylinder 2 has in its wall a longitudinal slot 10 through which a covering strip 12 delivered from a roll 11 is introduced into the cylinder 2 and passed between the inner surface thereof and the outer surface of the fibre body. Arranged between the roll 11 and the cylinder 2 underneath the strip 12 is a container 13 for glue which is continuously applied to the underside of the strip 12 by a roller 14 over which the strip is passed. To obtain satisfactory contact between the strip 12 and the roller 14 the former may be pressed on the latter by a counter roller 15. Instead of one there may also be supplied simultaneously several covering strips, in which case a corresponding number of feeding devices and lead-in slots are provided.

Figure 5:
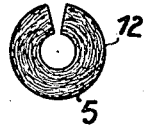
Fig. 5 is a cross-section of a finished longitudinally slit insulating tube.

The finished insulating tube is cut to the desired lengths by a disc saw 16 arranged adjacent to the exit end of the cylinder 2. This severing of the tube may also be performed by a band saw or any other suitable cutting mechanism. Another saw, not shown, may be used for slitting the tube longitudinally, as indicated in Fig. 5.

The insulating tubes are made as follows:

Threads, ropes, strips or the like of glass silk or similar material are fed from a suitable source to the rotating mandrel 3 and wound thereon to form fibre charges 5. These charges are pushed by the stopper 6, 7 directly into the moulding cylinder, where under a certain pressure they form a cylindrical fibre body. This fibre body is caused to rotate with the mandrel 1 by the action of the longitudinal ribs 4 and simultaneously advanced by its engagement with the threads 3 in the axial direction of the mandrel and cylinder. The fibre body has thus imparted to it a helical forward movement. The covering strip 12 glued by the roller 14 and introduced through the slot 10 between the inner surface of the cylinder 2 and the outer surface of the fibre body 5 is caused by the helical forward movement of the fibre body to wind tightly around the same along a helical line. The covering strips will be united by the glue and thus form a relatively strong envelope. In this way is formed by continuous operation an enveloped insulating tube which leaves the cylinder 2 and is cut in desired length by the saw 16. As already stated, the tubes can also be slit longitudinally, as is well-known in the art. This longitudinal slit allows the tubes to be bent open and enlarged, thereby facilitating the application of the tubes to the elements to be covered by them.

Having thus described my invention, what I claim as new and desire to secure by Letters-Patent is:—

1. A device for making insulating tubes of the kind described, comprising a rotatable mandrel on which to wind fibrous material in the form of a cylindrical body, a moulding cylinder in spaced concentric relation to the mandrel, means for introducing the fibrous bodies into moulding cylinder, screw threads on the inner surface of the moulding cylinder, a longitudinal slot in the wall of the moulding cylinder, and means for feeding a strip of covering material through the said slot into the moulding cylinder between the inner surface thereof and the outer surface of the fibre body.

2. A device for making insulating tubes of the kind described, comprising a rotatable mandrel on which to wind fibrous material in the form of cylindrical bodies, a moulding cylinder in spaced concentric relation to the mandrel, a flanged sleeve adapted to be shifted axially to and fro on the mandrel for pushing the fibre bodies into the space between the moulding cylinder and the mandrel, screw threads on the inner surface of the moulding cylinder, a longitudinal slot in the wall of this cylinder, and means for feeding through the said slot into the moulding cylinder a strip of covering material designed to form an envelope for the cylindrical fibre body.

3. A device for making insulating tubes of the kind described, comprising a rotatable mandrel on which to wind fibrous material in the form of cylindrical bodies, a moulding cylinder in spaced concentric relation to the mandrel, means for pushing the fibrous bodies axially of the mandrel into the moulding cylinder, longitudinal ribs on the portion of the mandrel surrounded by the moulding cylinder, screw threads on the inner surface of this cylinder, a longitudinal slot in the wall of the cylinder, and means for feeding through this slot into the cylinder a strip of covering material designed to form an envelope for the cylindrical fibre body.

4. A device for making insulating tubes of the kind described, comprising a rotatable mandrel on which to wind fibrous material in the form of cylindrical bodies, a moulding cylinder in spaced concentric relation to a portion of the mandrel, radial ribs on this mandrel portion, screw threads on the inner surface of the moulding cylinder, means for pushing the cylindrical fibre bodies axially of the mandrel into the moulding cylinder, cutting blades formed by the radial ribs of the mandrel at the inlet end of the moulding cylinder, a longitudinal slot in the wall of this cylinder, and means for feeding a strip of covering material through the said slot into the moulding cylinder, as and for the purpose specified.

5. A device for making insulating tubes of the kind described, comprising a rotatable mandrel on which to wind fibrous material in the form of cylindrical bodies, a moulding cylinder in spaced concentric relation to a portion of the mandrel, means for pushing the fibrous bodies axially of the mandrel into the moulding cylinder, screw threads on the inner surface of the moulding cylinder, a longitudinal slot in the wall of this cylinder, means for feeding through this slot into the cylinder a strip of covering material designed to wrap helically around the cylindrical fibre body, and means for applying glue to the underside of the covering strip before it enters the said slot of the moulding cylinder.

6. A device for making insulating tubes of the kind described, comprising a rotatable mandrel on which to wind fibrous material in the form of cylindrical bodies, a moulding cylinder in spaced concentric relation to a portion of the mandrel, a flanged sleeve adapted to be shifted to and fro on the mandrel for pushing the fibre bodies on the mandrel into the moulding cylinder, radial ribs on the mandrel portion surrounded by the moulding cylinder, cutting blades formed by these radial ribs at the inlet end of the moulding cylinder, radial slots in the flanged sleeve corresponding in number and position to the radial ribs of the mandrel, screw threads on the inner surface of the moulding cylinder, a longitudinal slot in the wall of this cylinder, and means for feeding through this slot into the cylinder a strip of covering material designed to form an envelope for the cylindrical fibre body.

7. A device for making insulating tubes of the kind described, comprising a rotatable mandrel on which to wind fibrous material in the form of cylindrical bodies, a moulding cylinder in spaced concentric relation to a portion of the mandrel, a flanged sleeve adapted to be shifted to and fro on the mandrel for pushing the fibre bodies on the mandrel into the moulding cylinder, radial ribs on the mandrel portion surrounded by the moulding cylinder, cutting blades formed by these radial ribs at the inlet end of the moulding cylinder, radial slots in the flanged sleeve corresponding in number and position to the radial ribs of the mandrel, screw threads on the inner surface of the moulding cylinder, a longitudinal slot in the wall of this cylinder, means for feeding through this slot into the cylinder a strip of covering material designed to form an envelope around the cylindrical fibre body, means for applying glue to the underside of the covering strip before it enters the slot of the moulding cylinder, and means in rear of the exit of the moulding cylinder for cutting the finished tubes to desired lengths.

FRIEDRICH ROSENGARTH.